United States Patent

Suyama

(10) Patent No.: US 11,069,922 B2
(45) Date of Patent: Jul. 20, 2021

(54) LIQUID ELECTROLYTE FOR LITHIUM ION SECONDARY BATTERIES, METHOD FOR PRODUCING THE LIQUID ELECTROLYTE, AND LITHIUM ION SECONDARY BATTERY

(71) Applicant: TOYOTA JIDOSHA KABUSHIKI KAISHA, Toyota (JP)

(72) Inventor: Hiroshi Suyama, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 70 days.

(21) Appl. No.: 16/462,785

(22) PCT Filed: Nov. 24, 2017

(86) PCT No.: PCT/JP2017/042271
§ 371 (c)(1),
(2) Date: May 21, 2019

(87) PCT Pub. No.: WO2018/097259
PCT Pub. Date: May 31, 2018

(65) Prior Publication Data
US 2019/0372172 A1    Dec. 5, 2019

(30) Foreign Application Priority Data
Nov. 28, 2016 (JP) .............................. JP2016-230172

(51) Int. Cl.
*H01M 10/36* (2010.01)
*H01M 4/58* (2010.01)
*H01M 10/0525* (2010.01)

(52) U.S. Cl.
CPC .............. *H01M 10/36* (2013.01); *H01M 4/58* (2013.01); *H01M 10/0525* (2013.01)

(58) Field of Classification Search
CPC ........... H01M 10/36; H01M 2300/002; H01M 2300/008
See application file for complete search history.

(56) References Cited

U.S. PATENT DOCUMENTS

2019/0089007 A1*    3/2019    Suyama ................ H01M 4/366

OTHER PUBLICATIONS

Liumin Suo, et al., ""Water-in-salt" electrolyte enables high-voltage aqueous lithium-ion chemistries", Science, Nov. 20, 2015, pp. 938-943, vol. 350, Issue 6263.
International Search Report for PCT/JP2017/042271 dated Feb. 13, 2018 (PCT/ISA/210).

* cited by examiner

*Primary Examiner* — Ula C Ruddock
*Assistant Examiner* — Thomas H. Parsons
(74) *Attorney, Agent, or Firm* — Sughrue Mion, PLLC

(57) ABSTRACT

Provided is a liquid electrolyte for lithium ion batteries, which shows an increased oxidation-side potential in a potential window than ever before. A liquid electrolyte for lithium ion secondary batteries, the liquid electrolyte containing a lithium salt of a sulfonimide and water, wherein the liquid electrolyte contains at least one kind of anion selected from the group consisting of an orthophosphoric ion, a pyrophosphate ion, an anion resulting from dissociation of phosphorous acid or a salt thereof, and an anion resulting from dissociation of phosphinic acid or a salt thereof.

10 Claims, 2 Drawing Sheets

LIQUID ELECTROLYTE FOR LITHIUM ION SECONDARY BATTERIES, METHOD FOR PRODUCING THE LIQUID ELECTROLYTE, AND LITHIUM ION SECONDARY BATTERY

This application is a National Stage of International Application No. PCT/JP2017/042271 filed Nov. 24, 2017, claiming priority based on Japanese Patent Application No. 2016-230172 filed Nov. 28, 2016.

TECHNICAL FIELD

The present invention relates to a liquid electrolyte for lithium ion secondary batteries, a method for producing the liquid electrolyte, and a lithium ion secondary battery.

BACKGROUND ART

It is known that due to the influence of contained water, aqueous liquid electrolytes for lithium ion secondary batteries have a limited electrochemically-stable potential range (potential window). As an example of trying to expand the potential window of aqueous liquid electrolytes, such an experiment is disclosed in Non-patent Literature 1, that an aqueous solution in which lithium bis(trifluorosulfonyl)imide (LiTFSI), which is a lithium salt of a sulfonimide, was contained as an electrolyte, was used as the liquid electrolyte of a lithium ion battery.

CITATION LIST

Non-Patent Literature 1: Suo, L. et al., Science, 2015, 350, 938-943

SUMMARY OF INVENTION

Technical Problem

However, it cannot be said that the liquid electrolyte described in Non-Patent Literature 1 has sufficient performance, since further improvement in performance is required of lithium ion secondary batteries.

The present invention was achieved in light of the above circumstance. An object of the present invention is to provide a liquid electrolyte for lithium ion secondary batteries, which contains a lithium salt of a sulfonimide and water, and which shows an increased oxidation-side potential in a potential window.

Solution to Problem

The liquid electrolyte for lithium ion secondary batteries according to the present invention, is a liquid electrolyte for lithium ion secondary batteries, the liquid electrolyte containing a lithium salt of a sulfonimide and water, wherein the liquid electrolyte contains at least one kind of anion selected from the group consisting of an orthophosphoric ion, a pyrophosphate ion, an anion resulting from dissociation of phosphorous acid or a salt thereof, and an anion resulting from dissociation of phosphinic acid or a salt thereof.

In the liquid electrolyte for lithium ion secondary batteries according to the present invention, the lithium salt of the sulfonimide is preferably at least one selected from the group consisting of lithium bis(trifluorosulfonyl)imide (LiTFSI) and lithium bis(fluorosulfonyl)imide (LiFSI).

In the liquid electrolyte for lithium ion secondary batteries according to the present invention, an amount of the LiTFSI per kg of the water is preferably from 5 mol to 21 mol, and the anion is preferably a pyrophosphate ion.

The method for producing a liquid electrolyte for lithium ion secondary batteries according to the present invention, is a method for producing a liquid electrolyte for lithium ion secondary batteries, the liquid electrolyte containing a lithium salt of a sulfonimide and water, wherein phosphorus oxyacid containing at least one kind of anion selected from the group consisting of an orthophosphoric ion, a pyrophosphate ion, a phosphorous acid ion and a phosphinic acid ion, or a salt thereof is added to the liquid electrolyte as an additive.

In the method for producing the liquid electrolyte for lithium ion secondary batteries according to the present invention, the lithium salt of the sulfonimide is preferably at least one selected from the group consisting of lithium bis(trifluorosulfonyl)imide (LiTFSI) and lithium bis(fluorosulfonyl)imide (LiFSI).

In the method for producing the liquid electrolyte for lithium ion secondary batteries according to the present invention, at least one kind of phosphorus oxoate selected from the group consisting of $Li_3PO_4$, $LiH_2PO_4$, $NaH_2PO_4$, $Na_2H_2P_2O_7$, $Na_2HPO_3$ and $NaPH_2O_2$, is preferably added.

In the method for producing the liquid electrolyte for lithium ion secondary batteries according to the present invention, an amount of the LiTFSI per kg of the water is preferably adjusted to 5 mol to 21 mol, and $Na_2H_2P_2O_7$ is preferably added as the phosphorus oxoate.

The lithium ion secondary battery according to the present invention is a lithium ion secondary battery comprising an anode, a cathode and a liquid electrolyte, wherein the liquid electrolyte contains a lithium salt of a sulfonimide and water, and wherein the liquid electrolyte contains at least one kind of anion selected from the group consisting of an orthophosphoric ion, a pyrophosphate ion, an anion resulting from phosphorous acid or a salt thereof, and an anion resulting from phosphinic acid or a salt thereof.

In the lithium ion secondary battery according to the present invention, the lithium salt of the sulfonimide is preferably at least one selected from the group consisting of lithium bis(trifluorosulfonyl)imide (LiTFSI) and lithium bis(fluorosulfonyl)imide (LiFSI).

In the lithium ion secondary battery according to the present invention, an amount of the LiTFSI per kg of the water is preferably from 5 mol to 21 mol, and the anion is preferably a pyrophosphate ion.

Advantageous Effects of Invention

According to the present invention, the following can be provided: a liquid electrolyte for lithium ion batteries, which contains a lithium salt of a sulfonimide and water, and which shows an increased oxidation-side potential in a potential window; a method for producing the liquid electrolyte for lithium ion secondary batteries; and a lithium ion secondary battery comprising the liquid electrolyte for lithium ion secondary batteries.

BRIEF DESCRIPTION OF DRAWINGS

In the accompanying drawings.

DESCRIPTION OF EMBODIMENTS

Figure 1:
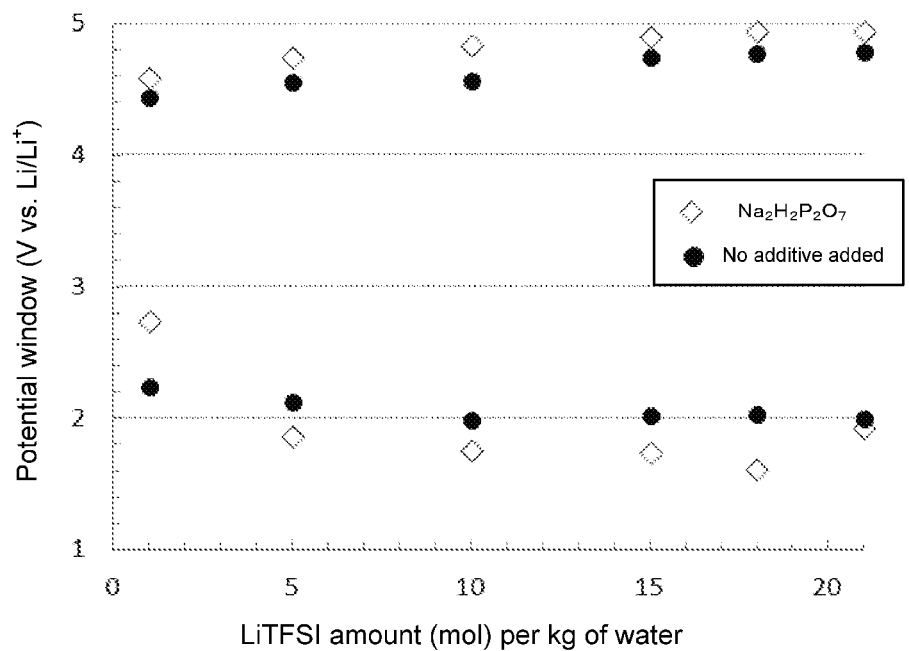
FIG. 1 is a graph showing a relationship between potential window and LiTFSI amount (mol) per kg of water, for a liquid electrolyte to which $Na_2H_2P_2O_7$ was added and for a liquid electrolyte in which no additive was used.

Hereinafter, the liquid electrolyte for lithium ion secondary batteries according to the disclosed embodiments, a method for producing the liquid electrolyte, and a lithium secondary battery comprising the liquid electrolyte, will be described in order.

1. Liquid Electrolyte for Lithium Ion Secondary Batteries

The liquid electrolyte for lithium ion secondary batteries according to the disclosed embodiments (hereinafter, it may be simply referred to as the liquid electrolyte of the disclosed embodiments) is a liquid electrolyte for lithium ion secondary batteries, the liquid electrolyte containing a lithium salt of a sulfonimide and water, wherein the liquid electrolyte contains at least one kind of anion selected from the group consisting of an orthophosphoric ion, a pyrophosphate ion, an anion resulting from dissociation of phosphorous acid or a salt thereof, and an anion resulting from dissociation of phosphinic acid or a salt thereof.

As described above, it was reported that when LiTFSI, which is a lithium salt of a sulfonimide, is used as the electrolyte of an aqueous liquid electrolyte, the potential window of the electrolyte expands. It is thought that this is because the sulfonimide causes a chemical reaction on an electrode surface to form a coating film (a solid electrolyte interface or SEI) and the SEI interferes with contact between water and the electrode, thereby suppressing decomposition of water.

In the disclosed embodiments, in addition to the lithium salt of the sulfonimide, the specific phosphorus oxyacid ion is incorporated in the aqueous liquid electrolyte, whereby the oxidation-side potential in the potential window can be further increased.

The reason for the increase in the oxidation-side potential in the potential window, is not clear. However, the reason is thought to be as follows: a solid electrolyte interface (SEI) that is excellent in Li ion conductivity, film thickness and coverage, can be formed since an electrochemical reaction product of the above-described sulfonimide and an electrochemical reaction product of the phosphorus oxyacid ion are contained in the SEI.

The increase in the oxidation-side potential in the potential window makes it possible to expand the potential window of the liquid electrolyte and to produce a lithium ion secondary battery with high voltage output. Moreover, it is advantageous in increasing the number of choices of usable electrode materials.

That is, since electrode materials are selected depending on the electrochemically stable potential range of the liquid electrolyte, some electrode materials that have not been usable so far, may become usable even when the width of the increase in the oxidation-side potential in the potential window is quantitatively small. Accordingly, it is difficult to judge the superiority of the electrolyte just by the width of the increase in the oxidation-side potential.

In the liquid electrolyte of the disclosed embodiments, an aqueous solution containing a lithium salt of a sulfonimide and water, is used.

The lithium salt of the sulfonimide, which is used as the electrolyte in the disclosed embodiments, is not particularly limited, as long as it can be used in the liquid electrolyte for lithium ion secondary batteries. As the lithium salt of the sulfonimide, examples include, but are not limited to, lithium bis(fluorosulfonyl)imide (LiFSI) (CAS No. 171611-11-3), lithium bis(trifluorosulfonyl)imide (LiTFSI) (CAS No. 90076-65-6), lithium bis(pentafluoroethanesulfonyl)imide (LiBETI) (CAS No. 132843-44-8), lithium bis(nonafluorobutanesulfonyl)imide (CAS No. 119229-99-1), lithium nonafluoro-N-[(trifluoromethane) sulfonyl]butanesulfonylamide (CAS No. 176719-70-3) and lithium N,N-hexafluoro-1,3-disulfonylimide (CAS No. 189217-62-7).

When the liquid electrolyte of the disclosed embodiments is used in the electrolyte layer of a lithium ion secondary battery, the sulfonimide and the below-described phosphorus oxyacid ion form a high-quality coating film (SEI) on an electrode surface.

In the liquid electrolyte of the disclosed embodiments, the imide structure reacts with the below-described specific phosphorus oxyacid anion, thereby forming the high-quality coating film. Therefore, as long as the electrolyte is the lithium salt of the sulfonimide, the oxidation-side potential in the potential window can be increased, regardless of the type of the lithium salt.

Of the lithium salts of the sulfonimides provided above, LiTFSI, LiFSI and LiBETI are preferred, since they have high Li ion conductivity and a high effect of increasing the oxidation-side potential in the potential window. LiTFSI and LiFSI are more preferred.

These lithium salts of the sulfonimides may be commercially-available products, or they may be synthesized in advance.

In the liquid electrolyte of the disclosed embodiments, the concentration of the lithium salt of the sulfonimide can be appropriately determined, depending on the properties of a desired battery, within a range that does not exceeds the saturation concentration of the lithium salt of the sulfonimide with respect to the solvent. This is because when part of the lithium salt of the sulfonimide remains in solid form in the liquid electrolyte, the solid component may interfere with battery reactions.

In general, the potential window expands as the concentration of the lithium salt of the sulfonimide in the liquid electrolyte increases. However, since the viscosity of the liquid electrolyte also increases, the Li ion conductivity of the liquid electrolyte has a tendency to decrease. Accordingly, the concentration is generally determined depending on the properties of the desired battery, considering the Li ion conductivity and the effect of expanding the potential window.

In the liquid electrolyte of the disclosed embodiments, whatever the concentration of the lithium salt of the sulfonimide is, which is determined depending on the desired battery, the oxidation-side potential in the potential window can be increased by incorporating the below-described specific phosphorus oxyacid ion in the liquid electrolyte.

In the disclosed embodiments, the concentration of the lithium salt of the sulfonimide in the liquid electrolyte is expressed as molality, that is, the mole number of the lithium salt of the sulfonimide per kg of the solvent.

In the liquid electrolyte in which LiTFSI is contained as the sulfonimide in combination with the below-described specific phosphorus oxyacid ion, the amount of the LiTFSI per kg of the water contained as the solvent, may be in a range of from 10 mol to 18 mol, since it is possible to obtain a liquid electrolyte which has high oxidation-side potential in the potential window and high Li ion conductivity compared to the conventional art.

The liquid electrolyte for lithium ion batteries according to the disclosed embodiments, contains water as the main solvent. In the liquid electrolyte, a component other than water (such as a non-aqueous solvent) may be contained as the solvent, to a degree that does not affect the effects of the present invention. More specifically, the content of the water in the solvent may be 95 mass % or more, or it may be 99% or more.

In the liquid electrolyte of the disclosed embodiments, a lithium material other than the lithium salt of the sulfonimide may be contained. With respect to the total mole number of the lithium material contained in the liquid electrolyte, the molar ratio of the lithium salt of the sulfonimide may be 0.1 or more, or it may be 0.5 or more.

The liquid electrolyte of the disclosed embodiments contains at least one kind of anion selected from the group consisting of an orthophosphoric ion, a pyrophosphate ion, an anion resulting from dissociation of phosphorous acid or a salt thereof, and an anion resulting from dissociation of phosphinic acid or a salt thereof.

The concentration of the phosphorus oxyacid ion is not particularly limited. As described above, depending on the properties of the desired battery, the liquid electrolyte of the disclosed embodiments may be a mixed aqueous solution of the phosphorus oxyacid ion and the lithium salt of the sulfonimide, which is in relatively high concentration. In the liquid electrolyte of the disclosed embodiments, when the phosphorus oxyacid ion cannot be easily dissolved due to the relatively high concentration of the lithium salt of the sulfonimide, it is preferable to increase the concentration of the phosphorus oxyacid ion as high as possible, and it is more preferable that the phosphorus oxyacid ion is in a saturated state.

In the disclosed embodiments, the term "orthophosphoric ion" refers to anions represented by the following three chemical formulae: $PO_4^{3-}$, $HPO_4^{2-}$ and $H_2PO_4^-$. The term "pyrophosphate ion" refers to anions represented by the following four chemical formulae: $P_2O_7^{4-}$, $HP_2O_7^{3-}$, $H_2P_2O_7^{2-}$ and $H_3P_2O_7^-$.

Also in the disclosed embodiments, the term "an anion resulting from dissociation of phosphorous acid or a salt thereof" refers to both a phosphonic acid ion (divalent) and a phosphorous acid ion (trivalent), both of which may be present as a tautomer in the liquid electrolyte. The term "phosphonic acid ion" refers to anions represented by the following two chemical formulae: $PHO_3^{2-}$ and $HPHO_3^-$. The term "phosphorous acid ion" refers to anions represented by the following three chemical formulae: $PO_3^{3-}$, $HPO_3^{2-}$ and $H_2PO_3^-$.

Also in the disclosed embodiments, the term "an anion resulting from dissociation of phosphinic acid or a salt thereof" refers to both a phosphinic acid ion (monovalent) and a phosphonous acid ion (divalent), both of which may be present as a tautomer in the liquid electrolyte. The term "phosphinic acid ion" refers to an anion represented by the following chemical formula: $PH_2O_2^-$. The term "phosphonous acid ion" refers to anions represented by the following two chemical formulae: $PHO_2^{2-}$ and $HPHO_2^-$.

The dissociation state or tautomer state of the phosphorus oxyacid ion contained in the liquid electrolyte of the disclosed embodiments, varies due to the influence of the pH of the liquid electrolyte, the influence of the lithium salt of the sulfonimide, etc. Accordingly, it is difficult to identify, among the above-mentioned chemical formulae, which anion state or at what ratio the phosphorus oxyacid ion is.

As long as the condition that the liquid electrolyte contains at least one kind of anion selected from the group consisting of anions represented by the above-described chemical formulae, is satisfied, the effect of the disclosed embodiments, that is, the effect of increasing the oxidation-side potential in the potential window of the liquid electrolyte, can be achieved.

In the liquid electrolyte of the disclosed embodiments, the anion is preferably an orthophosphoric ion or pyrophosphate ion, and more preferably a pyrophosphate ion, since the effect of increasing the oxidation-side potential in the potential window is high.

When the anion is a pyrophosphate ion, it is preferable that the lithium salt of the sulfonimide is LiTFSI and the amount of the LiTFSI per kg of the water is from 5 mol to 21 mol. This is because the liquid electrolyte can obtain not only an increase in the oxidation-side potential, but also a large decrease in the reduction-side potential, thereby obtaining a high potential window expanding effect. It is particularly preferable that the amount of the LiTFSI per kg of the water is from 5 mol to 18 mol, because the liquid electrolyte can be a liquid electrolyte having a much wider potential window and higher Li ion conductivity than conventional aqueous liquid electrolytes.

The reason why the liquid electrolyte shows a wide potential window when the phosphorus oxyacid ion is a pyrophosphate ion and the amount of the LiTFSI per kg of the water is from 5 mol to 21 mol, is not clear. However, it is thought that this is due to influences resulting from the following: since the state of polarization differs between the pyrophosphate ion and other phosphorus oxyacid ions, a difference in adsorption to an electrode surface is caused, and the pyrophosphate ion has higher solubility than other phosphorus oxyacid ions.

The pH of the liquid electrolyte of the disclosed embodiments is not particularly limited, as long as the liquid electrolyte can be used as a liquid electrolyte. The pH is preferably in a range of from 3 to 11, and more preferably in a range of from 5 to 9.

2. Method for Producing Liquid Electrolyte for Lithium Ion Secondary Batteries

In the method for producing a liquid electrolyte for lithium ion secondary batteries according to the disclosed embodiments, the liquid electrolyte containing a lithium salt of a sulfonimide and water, phosphorus oxyacid containing at least one kind of anion selected from the group consisting of an orthophosphoric ion, a pyrophosphate ion, a phosphorous acid ion and a phosphinic acid ion, or a salt thereof is added to the liquid electrolyte as an additive. However, the above-described liquid electrolyte for lithium ion secondary batteries according to the disclosed embodiments, is not limited to a liquid electrolyte for lithium ion secondary batteries, which is produced by this production method.

In the production method of the disclosed embodiments, the liquid electrolyte containing the lithium salt of the sulfonimide and the water is used as a base solution to which phosphorus oxyacid or a salt thereof is added. The liquid electrolyte and preferred embodiments thereof are the same as the aqueous solution described above under "1. Liquid electrolyte for lithium ion secondary batteries", the aqueous solution containing the lithium salt of the sulfonimide and the water.

In the production method of the disclosed embodiments, as an additive, the phosphorus oxyacid containing at least one kind of anion selected from the group consisting of an orthophosphoric ion, a pyrophosphate ion, a phosphorous acid ion and a phosphinic acid, or a salt thereof is added to the liquid electrolyte containing the lithium salt of the sulfonimide and the water. As the phosphorus oxoate, examples include, but are not limited to, $Li_3PO_4$ (trilithium phosphate), $LiH_2PO_4$ (lithium dihydrogen phosphate), $NaH_2PO_4$ (sodium dihydrogen phosphate), $Na_2H_2P_2O_7$ (disodium dihydrogen pyrophosphate), $Na_2HPO_3$ (disodium hydrogen phosphite) and $NaPH_2O_2$ (sodium phosphinate, also known as sodium hypophosphite).

By adding the above-described phosphorus oxyacid or the salt thereof, an orthophosphoric ion, a pyrophosphate ion, an anion resulting from phosphorous acid or a salt thereof, and an anion resulting from phosphinic acid or a salt thereof, are supplied to the liquid electrolyte for lithium ion secondary batteries, the liquid electrolyte containing the lithium salt of the sulfonimide and the water.

As long as the additive is a compound that can supply the above-described specific phosphorus oxyacid ion to the liquid electrolyte, it can be added in an acid state or in a salt state. The state of the additive can be appropriately selected depending on the pH of the liquid electrolyte, for example. In general, the pH of the aqueous solution containing the lithium salt of the sulfonimide and the water, to which the additive is added, is close to neutral. Since the liquid electrolyte of the disclosed embodiments is used at a pH that is close to neutral, the additive is preferably added in a salt state.

The amount of the phosphorus oxyacid or the salt thereof is not particularly limited. As described above, since the amount of the phosphorus oxyacid or the salt thereof, which is soluble in the aqueous solution containing the lithium salt of the sulfonimide in relatively high concentration, is relatively small, the phosphorus oxyacid or the salt thereof may be added until it is saturated. When the phosphorus oxyacid or the salt thereof is not absolutely dissolved and remains in a solid form, the liquid electrolyte may be used as it is, or it may be used after the remaining acid or salt is removed therefrom.

When $Na_2H_2P_2O_7$ is added as the phosphorus oxoate, it is preferable that LiTFSI is used as the lithium salt of the sulfonimide and the amount of the LiTFSI per kg of the water is adjusted to be in a range of from 5 mol to 21 mol. This is because the thus-obtained liquid electrolyte can achieve not only an increase in the oxidation-side potential, but also a large decrease in the reduction-side potential, thereby obtaining a high potential window expanding effect. It is more preferable that the amount of the LiTFSI per kg of the water is adjusted to be in a range of from 5 mol/kg to 18 mol/kg, because the thus-obtained liquid electrolyte has a much wider potential window and higher Li ion conductivity than the conventional art.

3. Lithium Ion Secondary Battery

The lithium ion secondary battery of the disclosed embodiments is a lithium ion secondary battery comprising an anode, a cathode and a liquid electrolyte, wherein the liquid electrolyte contains a lithium salt of a sulfonimide and water, and wherein the liquid electrolyte contains at least one kind of anion selected from the group consisting of an orthophosphoric ion, a pyrophosphate ion, an anion resulting from dissociation of phosphorous acid or a salt thereof, and an anion resulting from dissociation of phosphinic acid or a salt thereof. In the lithium ion secondary battery of the disclosed embodiments, a separator, a conductive additive, a binder and so on can be appropriately used.

The liquid electrolyte used in the lithium ion secondary battery of the disclosed embodiments will not be described here, since it is the same as the liquid electrolyte of the disclosed embodiments described above under "1. Liquid electrolyte for lithium ion secondary batteries".

In the lithium ion secondary battery of the disclosed embodiments, it is difficult to strictly specify the composition of the liquid electrolyte, since the composition is changed by a charge-discharge reaction (an oxidation-reduction reaction) and the reactions are accumulated by repeating charging and discharging. However, whatever the composition is, the lithium ion secondary battery of the disclosed embodiments can be a lithium ion secondary battery showing high input and output potentials on the oxidation side, since it contains a lithium salt of a sulfonimide and water, and it contains at least one kind of anion selected from the group consisting of an orthophosphoric ion, a pyrophosphate ion, an anion resulting from phosphorous acid or a salt thereof, and an anion resulting from phosphinic acid or a salt thereof.

As described above, as long as the condition that the liquid electrolyte contains the lithium salt of the sulfonimide and the above-described specific phosphorus oxyacid ion, is satisfied, a high-quality SEI is formed on an electrode. Therefore, the oxidation-side potential in the potential window of the liquid electrolyte is increased.

As the cathode active material used in the cathode, for example, a material which shows oxidation-reduction reactivity to lithium ions and which contains at least one kind of transition metal element, can be used. As the cathode active material, an oxide material, a polyanion material, an organic material and the like are preferred.

As an anode active material used in the anode, examples include, but are not limited to, a material mainly containing a sulfur element, $Mo_6S_8$ chevrel, lithium titanium oxides as typified by $Li_4Ti_5O_{12}$, sulfur, carbon, materials that can form an alloy with Li (such as Si and Sn) and a metal-organic framework (MOF). $Li_4Ti_5O_{12}$ is preferably used as the anode active material, since an excellent SEI can be easily formed.

In general, a separator can be used in the lithium ion secondary battery of the disclosed embodiments. The separator is disposed between the cathode and the anode, and it functions to prevent contact between the cathode and the anode and to form an electrolyte layer by retaining the liquid electrolyte. In the lithium ion secondary battery of the disclosed embodiments, as the separator, a separator that is generally used in batteries comprising an aqueous liquid electrolyte, can be used. As the material for the separator, examples include, but are not limited to, resins such as polyethylene (PE), polypropylene (PP), polyester, cellulose and polyamide.

Also in the disclosed embodiments, the separator may be a nonwoven fabric such as a resin nonwoven fabric and a cellulose-based nonwoven fabric. The separator is preferably a cellulose-based nonwoven fabric. The thickness of the separator is not particularly limited, and it is the same as the thickness of separators used in common lithium ion secondary batteries.

As the conductive additive and binder used in electrodes, etc., those that are generally used in lithium ion batteries can be used.

The conductive additive is not particularly limited, as long as it can increase electroconductivity. As the conductive additive, examples include, but are not limited to, carbon black such as acetylene black and furnace black, carbon nanotube (CNT) and carbon nanofiber (CNF).

As the binder, examples include, but are not limited to, polyvinylidene fluoride (PVdF), polytetrafluoroethylene (PTFE), butylene rubber (BR) and styrene-butadiene rubber (SBR).

The lithium ion secondary battery of the disclosed embodiments may include a battery casing for housing the cathode, the electrolyte layer, the anode and so on. As the form of the battery casing, examples include, but are not limited to, a coin form, a flat plate form, a cylindrical form and a laminate form.

EXAMPLES

Example 1

1. Preparation of Liquid Electrolyte for Lithium Ion Secondary Batteries

A base solution was prepared by mixing LiTFSI (manufactured by Tokyo Chemical Industry Co., Ltd.) and water so that the amount of the LiTFSI was 21 mol per kg of the water. To the thus-obtained base solution, $Li_3PO_4$ (trilithium phosphate manufactured by Aldrich) was added so that the amount of the $Li_3PO_4$ was 1 mass %. After the base solution was diffused for 15 minutes in an ultrasonic generator, the temperature of the thus-obtained mixed solution was kept at 40° C. by use of a thermostat bath, thereby accelerating dissolution of the LiTFSI and the $Li_3PO_4$ in the water. The mixed solution was left to stand overnight at 40° C., thereby preparing the liquid electrolyte of Example 1.

The liquid electrolyte of Example 1 was in such a saturated solution state, that the added $Li_3PO_4$ was not absolutely dissolved, and part of the $Li_3PO_4$ was precipitated. Accordingly, the liquid electrolyte was left to stand, and the resulting supernatant was extracted without incorporation of the precipitated $Li_3PO_4$ into the supernatant. The collected supernatant was used for evaluations described later.

2. Preparation of Cell for Potential Window Evaluation

For potential window evaluation, a batch cell for battery evaluation ("SBIA" manufactured by EC Frontier Co., Ltd.) was used, in which a SUS 316 foil (manufactured by Nilaco Corporation) was used in the working and counter electrodes, and Ag/AgCl (manufactured by International Chemistry Co., Ltd.) was used in the reference electrode. The liquid electrolyte was injected into the batch cell for battery evaluation, thereby producing a cell for potential window evaluation.

3. Preparation of Cell for Ionic Resistance Measurement

A cell for ionic resistance measurement was prepared in the same manner as the cell for potential window evaluation. For ionic resistance measurement, the reference electrode was not used, and the cathode and the anode were used.

4. Evaluation Conditions

As an electrochemical measurement device, a multichannel potentiostat/galvanostat "VMP3" (manufactured by Bio-Logic SAS) was used. The temperature of the cells was controlled by use of a thermostat bath ("LU-124" manufactured by ESPEC Corp.) during evaluation.

4-1. Potential Window Evaluation Method

Potential window evaluation was carried out by cyclic voltammetry (CV) of the cell for potential window evaluation. The cell temperature was controlled to 25° C.

First, potential sweeping was started from the open circuit potential (OCP) to the noble potential direction at a sweep rate of 1 mV/s, and it was repeated between the OCP and an upper limit of 5.2 V (vs $Li/Li^+$). A potential at which a current peak started to appear during sweeping from the OCP to 5.2 V (vs. $Li/Li^+$), which was thought to appear in response to oxidation decomposition of water, was determined as the oxidation-side potential in the liquid electrolyte.

Another cell was prepared in the same manner as above. Potential sweeping was started from the open circuit potential (OCP) to the base potential direction at a sweep rate of 1 mV/s, and it was repeated between the OCP and a lower limit of 1.4 V (vs. $Li/Li^+$). A potential at which a current peak started to appear during potential sweeping from the OCP to 1.4 V (vs. $Li/Li^+$), which was thought to appear in response to reduction decomposition of water, was determined as the reduction-side potential of the liquid electrolyte.

The potential range between the oxidation-side potential and the reduction-side potential was determined as the potential window of the liquid electrolyte. It can be evaluated that the wider the potential window ($\Delta V$), the wider the electrochemically stable potential range.

4-2. Ionic Resistance Measurement Method

Ionic resistance measurement was carried out by AC impedance measurement of the cell for ionic resistance measurement. The detailed measurement conditions are as follows.

Current: 10 mV AC

Frequency: 1 kHz to 100 kHz

Cell temperature: 25° C.

Examples 2 to 21 and Comparative Examples 1 to 9

The liquid electrolytes of Examples 2 to 21 and Comparative Examples 1 to 9 were prepared in the same manner as Example 1, except that the concentration of the LiTFSI and the type of the additive used in the above-mentioned "1. Preparation of liquid electrolyte for lithium ion secondary batteries" were changed as shown in the following Table 1. As the additive, $LiH_2PO_4$ (lithium dihydrogen phosphate, manufactured by Aldrich), $NaH_2PO_4$ (sodium dihydrogen phosphate, manufactured by Aldrich), $Na_2H_2P_2O_7$ (disodium dihydrogen pyrophosphate, manufactured by Aldrich), $Na_2HPO_3$ (disodium hydrogen phosphite, manufactured by Aldrich), $NaPH_2O_2$ (sodium phosphinate, manufactured by Aldrich), $Na_2S_2O_3$ (sodium thiosulfate, manufactured by Aldrich), NaSCN (sodium thiocyanate, manufactured by Aldrich) and $K_2S$ (potassium sulfide, manufactured by Aldrich) were used.

Using the liquid electrolytes, cells for potential window evaluation and cells for ionic resistance measurement were prepared and evaluated in the same manner as Example 1.

TABLE 1

| | Electrolyte | | Additive | | Withstand voltage | | | | | Difference from oxidation-side potential of liquid electrolyte to which no additive was added. | | |
| | | Mol per kg of water | | Amount added (mass %) | V vs. Ag/AgCl | | V vs. Li/Li+ | | | Vs. the same | | Ionic resistance (Ω) |
| | Type | | Type | | Reduction side | Oxidation side | Reduction side | Oxidation side | ΔV | Vs. Comparative Example 1 | mol/kg of water | |
|---|---|---|---|---|---|---|---|---|---|---|---|---|
| Example 1 | LiTFSi | 21 | Li$_3$PO$_4$ | 1 | −1.24 | 1.70 | 2.01 | 4.94 | 2.94 | 0.15 | 0.15 | 55.6 |
| Example 2 | LiTFSi | 15 | Li$_3$PO$_4$ | 1 | −1.24 | 1.62 | 2.01 | 4.86 | 2.86 | 0.07 | 0.08 | 24.3 |
| Example 3 | LiTFSi | 1 | Li$_3$PO$_4$ | 1 | −1.00 | 1.39 | 2.24 | 4.63 | 2.39 | −0.16 | 0.19 | 12.1 |
| Example 4 | LiTFSi | 21 | Na$_2$H$_2$P$_2$O$_7$ | 1 | −1.31 | 1.70 | 1.93 | 4.94 | 3.01 | 0.15 | 0.15 | 55.6 |
| Example 5 | LiTFSi | 18 | Na$_2$H$_2$P$_2$O$_7$ | 1 | −1.63 | 1.70 | 1.61 | 4.94 | 3.33 | 0.15 | 0.16 | 29.9 |
| Example 6 | LiTFSi | 15 | Na$_2$H$_2$P$_2$O$_7$ | 1 | −1.50 | 1.66 | 1.74 | 4.90 | 3.16 | 0.11 | 0.15 | 25.8 |
| Example 7 | LiTFSi | 10 | Na$_2$H$_2$P$_2$O$_7$ | 1 | −1.48 | 1.60 | 1.76 | 4.84 | 3.08 | 0.05 | 0.27 | 13.8 |
| Example 8 | LiTFSi | 5 | Na$_2$H$_2$P$_2$O$_7$ | 1 | −1.38 | 1.50 | 1.87 | 4.74 | 2.88 | −0.05 | 0.18 | 9.5 |
| Example 9 | LiTFSi | 1 | Na$_2$H$_2$P$_2$O$_7$ | 1 | −0.50 | 1.35 | 2.74 | 4.59 | 1.85 | −0.20 | 0.15 | 15.0 |
| Example 10 | LiTFSi | 21 | LiH$_2$PO$_4$ | 1 | −1.22 | 1.63 | 2.02 | 4.87 | 2.85 | 0.08 | 0.08 | 52.3 |
| Example 11 | LiTFSi | 18 | LiH$_2$PO$_4$ | 1 | −1.29 | 1.66 | 1.95 | 4.90 | 2.95 | 0.11 | 0.12 | 38.7 |
| Example 12 | LiTFSi | 15 | LiH$_2$PO$_4$ | 1 | −1.28 | 1.64 | 1.96 | 4.88 | 2.92 | 0.09 | 0.13 | 31.8 |
| Example 13 | LiTFSi | 10 | LiH$_2$PO$_4$ | 1 | −1.36 | 1.58 | 1.88 | 4.82 | 2.94 | 0.03 | 0.25 | 13.7 |
| Example 14 | LiTFSi | 21 | NaH$_2$PO$_4$ | 1 | −1.33 | 1.67 | 1.91 | 4.92 | 3.00 | 0.13 | 0.13 | 50.4 |
| Example 15 | LiTFSi | 18 | NaH$_2$PO$_4$ | 1 | −1.35 | 1.63 | 1.89 | 4.88 | 2.99 | 0.09 | 0.10 | 35.4 |
| Example 16 | LiTFSi | 21 | Na$_2$HPO$_3$ | 1 | −1.24 | 1.64 | 2 | 4.88 | 2.88 | 0.09 | 0.09 | 54.2 |
| Example 17 | LiTFSi | 18 | Na$_2$HPO$_3$ | 1 | −1.25 | 1.62 | 1.99 | 4.86 | 2.87 | 0.07 | 0.08 | 40.0 |
| Example 18 | LiTFSi | 1 | Na$_2$HPO$_3$ | 1 | −1.00 | 1.45 | 2.24 | 4.69 | 2.45 | −0.10 | 0.25 | 11.1 |
| Example 19 | LiTFSi | 21 | NaPH$_2$O$_2$ | 1 | −1.23 | 1.65 | 2.01 | 4.89 | 2.88 | 0.10 | 0.10 | 57.4 |
| Example 20 | LiTFSi | 18 | NaPH$_2$O$_2$ | 1 | −1.18 | 1.60 | 2.06 | 4.84 | 2.78 | 0.05 | 0.06 | 43.8 |
| Example 21 | LiTFSi | 1 | NaPH$_2$O$_2$ | 1 | −0.99 | 1.36 | 2.25 | 4.60 | 2.35 | −0.19 | 0.16 | 11.8 |
| Comparative Example 1 | LiTFSi | 21 | — | — | −1.24 | 1.55 | 2.01 | 4.79 | 2.78 | 0.00 | — | 58.7 |
| Comparative Example 2 | LiTFSi | 18 | — | — | −1.21 | 1.54 | 2.03 | 4.78 | 2.75 | −0.01 | — | 37.2 |
| Comparative Example 3 | LiTFSi | 15 | — | — | −1.22 | 1.51 | 2.02 | 4.75 | 2.73 | −0.04 | — | 24.9 |
| Comparative Example 4 | LiTFSi | 10 | — | — | −1.25 | 1.33 | 1.99 | 4.57 | 2.58 | −0.22 | — | 18.0 |
| Comparative Example 5 | LiTFSi | 5 | — | — | −1.11 | 1.32 | 2.13 | 4.56 | 2.43 | −0.23 | — | 9.5 |
| Comparative Example 6 | LiTFSi | 1 | — | — | −1.00 | 1.20 | 2.24 | 4.44 | 2.20 | −0.35 | — | 17.7 |
| Comparative Example 7 | LiTFSi | 21 | Na$_2$S$_2$O$_3$ | 1 | −1.11 | 1.42 | 2.14 | 4.66 | 2.52 | −0.13 | — | — |
| Comparative Example 8 | LiTFSi | 21 | NaSCN | 1 | −1.10 | 0.69 | 2.15 | 3.93 | 1.78 | −0.86 | — | — |
| Comparative Example 9 | LiTFSi | 21 | K$_2$S | 1 | −1.11 | 1.50 | 2.13 | 4.74 | 2.61 | −0.05 | — | — |

Example 22 and Comparative Example 10

1. Preparation of Liquid Electrolyte for Lithium Ion Secondary Batteries

The liquid electrolyte of Example 22 was prepared in the same manner as Example 4, except that the LiTFSI (manufactured by Tokyo Chemical Industry Co., Ltd.) used as the electrolyte was changed to LiFSI (manufactured by Kishida Chemical Co., Ltd.) The liquid electrolyte of Comparative Example 10 was prepared in the same manner as Comparative Example 1, except that the LiTFSI used as the electrolyte was changed to LiFSI.

2. Potential Window Evaluation

Using the liquid electrolytes of Example 22 and Comparative Example 10, cells for potential window evaluation were prepared and evaluated in the same manner as Example 1.

3. Evaluation of Charge-Discharge Efficiency

Using the liquid electrolytes of Example 22 and Comparative Example 10, lithium ion secondary batteries for charge-discharge efficiency evaluation were prepared, the batteries comprising an electrode that was produced as follows.

Charge-discharge reaction was repeated 100 cycles within a range of from 1.62 V (vs. Li/Li+) to 2.32 V (vs. Li/Li+). For each cycle, the charge-discharge efficiency was obtained from the amount of charge applied during each charge-discharge reaction.

[Electrode Production Conditions]

Li$_4$Ti$_5$O$_{12}$ (LTO) was used as the active material of a working electrode (anode). LiMn$_2$O$_4$ (LMO) was used as the active material of a counter electrode (cathode). Acetylene black was used as a conductive additive. PVdF was used as a binder. A SUS316L foil (manufactured by Nilaco Corporation) was used as the current collector of the cathode and the current collector of the anode. First, each active material and the conductive additive were mixed in a mortar. Then, PVdF was added thereto. The active material, the conductive additive and the PVdF were used at a molar ratio of 85:10:5. While checking the viscosity of the mixture, NMP was added thereto. They were continuously mixed in the mortar until a uniform mixture was obtained. Then, the uniform mixture was transferred to an ointment container and mixed with a mixer ("THINKY MIXER" manufactured by Thinky Corporation) at 3000 rpm for 10 minutes, thereby obtaining a slurry. The slurry was placed on a metal foil, and the foil was coated with the slurry by a doctor blade. Then, the coated foil was left to stand overnight in a dryer at 60° C. to dry the solvent, thereby obtaining an electrode. Finally, two electrodes were obtained. Each electrode was cut into a circular form having a diameter of 16 mm, and the electrode cut in the circular form was roll-pressed so as to obtain a porosity of 40%. The capacity of the LTO electrode was 0.3 mAh/cm$^2$, and that of the LMO electrode was 0.6 mAh/cm$^2$.

tial increases and the reduction-side potential decreases. For the liquid electrolyte of Comparative Example 1 in which the amount of the LiTFSI per kg of the water was 21 mol, the oxidation-side potential was 4.79 V vs. Li/Li$^+$; the reduction-side potential was 2.01 V vs. Li/Li$^+$; and the potential window ($\Delta$V) was 2.78 V and the largest.

For the liquid electrolytes of Comparative Examples 7 to 9, which were obtained by adding $Na_2S_2O_3$, NaSCN and $K_2S$, respectively, to the base solution in which the amount of the LiTFSI per kg of the water was the same as Comparative Example (21 mol), the oxidation-side potential was lower than the liquid electrolyte of Comparative Example 1 in which no additive was contained, and the potential window was entirely reduced. Accordingly, it was revealed that by adding the sulfide-based compounds, anions produced from the additives attach to the electrode surface, thereby accelerating decomposition of the water and creating negative effects.

When the liquid electrolytes of Examples 1 to 21 are compared to the liquid electrolytes of Comparative

TABLE 2

| | Electrolyte | | Additive | | Withstand voltage | | | | | Difference from oxidation-side potential of liquid electrolyte to which no additive was added. | | |
|---|---|---|---|---|---|---|---|---|---|---|---|---|
| | | Mol per kg of water | | Amount added (mass %) | V vs. Ag/AgCl | | V vs. Li/Li$^+$ | | | Vs. | Vs. the same mol/kg of water | Ionic resistance ($\Omega$) |
| | Type | | Type | | Reduction side | Oxidation side | Reduction side | Oxidation side | $\Delta$V | Comparative Example 1 | | |
| Example 22 | LiFSi | 21 | $Na_2H_2P_2O_7$ | 1 | −1.45 | 1.60 | 1.79 | 4.84 | 3.05 | 0.30 | 0.30 | — |
| Comparative Example 10 | LiFSi | 21 | — | — | −1.15 | 1.30 | 2.09 | 4.54 | 2.45 | 0.00 | — | — |

5. Results and Consideration

For Examples 1 to 21 and Comparative Examples 1 to 9, Table 1 shows the compositions of the liquid electrolytes in each of which LiTFSI was used as the electrolyte, the potential window evaluation results, and the ionic resistance measurement results. For Example 22 and Comparative Example 10, Table 2 shows the compositions of the liquid electrolytes in each of which LiFSI was used as the electrolyte, and the potential window evaluation results.

Figure 2:
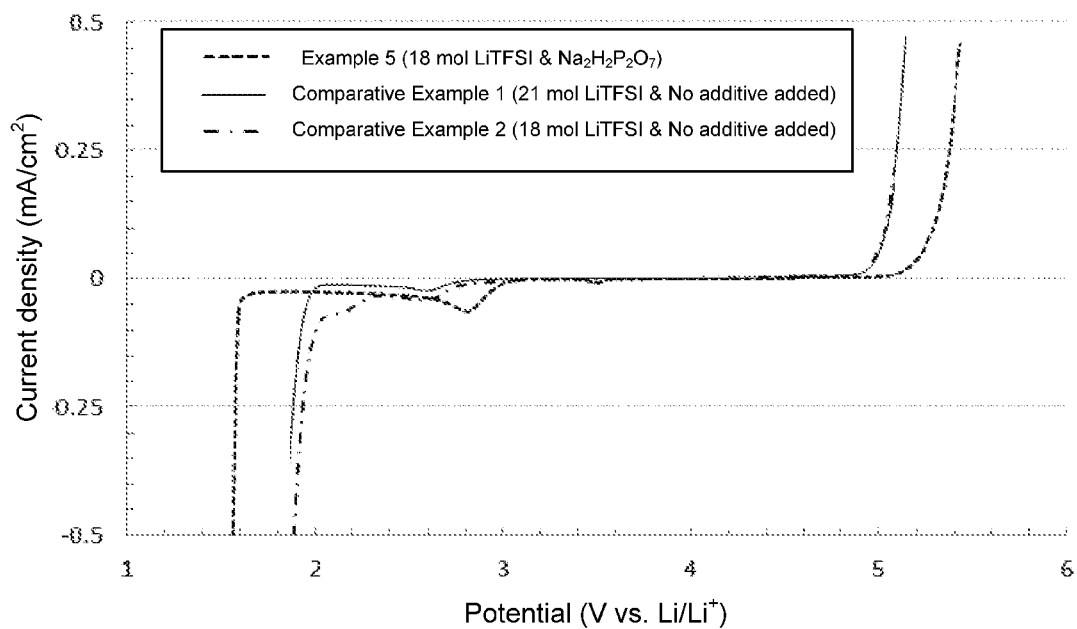
FIG. 2 is a view showing the linear sweep voltammograms of the liquid electrolytes of Example 4 and Comparative Example 1.
Figure 3:
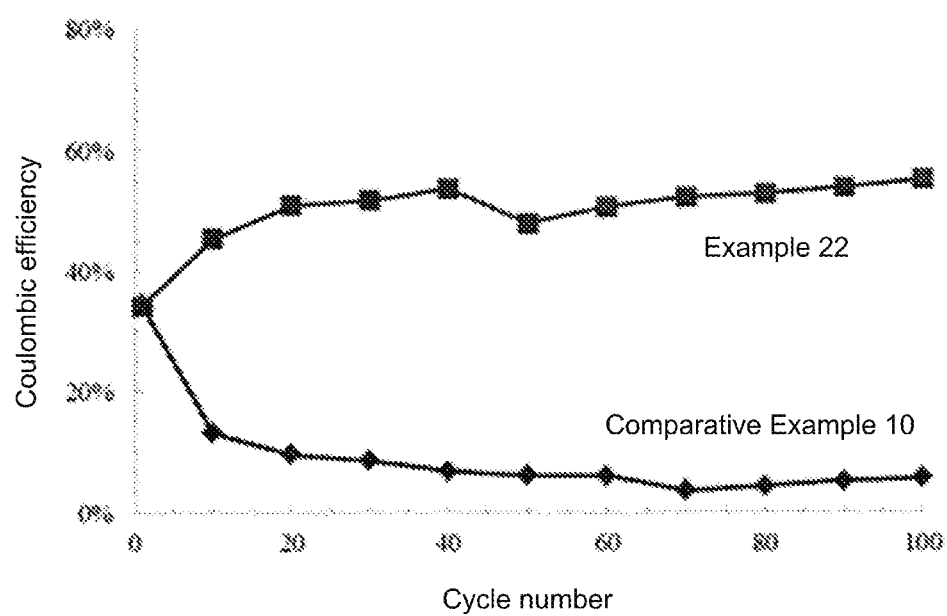
FIG. 3 is a view showing a relationship between cycle number and charge-discharge efficiency for a lithium ion secondary battery comprising the liquid electrolyte of Example 22 and for a lithium ion secondary battery comprising the liquid electrolyte of Comparative Example 10.

FIG. 1 shows a graph showing a relationship between potential window ($\Delta$V) and LiTFSI amount per kg of water, for a liquid electrolyte to which $Na_2H_2P_2O_7$ was added and for a liquid electrolyte in which no additive was used. As a reference, FIG. 2 shows the linear sweep voltammograms of the liquid electrolytes of Example 5 and Comparative Examples 1 and 2. Also, FIG. 3 shows a graph showing a relationship between cycle number and charge-discharge efficiency for lithium ion secondary batteries produced from the liquid electrolytes of Example 22 and Comparative Example 10 in each of which LiFSI was used as the electrolyte.

From the results of Comparative Examples 1 to 6, the following tendency was observed: as the amount of the LiTFSI per kg of the water (the concentration of the LiTFSI in the liquid electrolyte) increases, the oxidation-side poten- Examples 1 to 6 in terms of the amount of the LiTFSI per kg of the water, the liquid electrolytes of Examples 1 to 21 which were obtained by adding $Li_3PO_4$, $LiH_2PO_4$, $NaH_2PO_4$, $Na_2H_2P_2O_7$, $Na_2HPO_3$ and $NaPH_2O_2$, respectively, to the base solution containing LiTFSI and water, showed higher oxidation-side potentials than the liquid electrolytes of Comparative Examples 1 to 6 in each of which no additive was contained.

Especially, it was revealed that the liquid electrolytes of Examples 2, 5 to 7, 11 to 13, 15, 17 and 20 in each of which the above-described phosphorus oxoate was added while the amount of the LiTFSI per kg of the water was in a range of from 10 mol to 18 mol, show such an outstanding effect, that they show higher oxidation-side potentials than the liquid electrolyte of Comparative Example 1 in which the amount of the LiTFSI per kg of the water was 21 mol and no additive was added, and they can also increase ion conductivity. As shown in Comparative Examples 1 to 6, in the case of the conventional liquid electrolyte in which only LiTFSI is used, when the amount of the LiTFSI per kg of the water (the concentration of the LiTFSI in the liquid electrolyte) is increased to increase the oxidation-side potential, the viscosity increases and, as a result, the ionic resistance also increases. In the case of the liquid electrolyte of the disclosed embodiments, due to the addition of the specific phosphorus oxoate, the oxidation-side potential can be increased without increasing the viscosity of the liquid electrolyte. Therefore, it is thought that the liquid electrolyte having the higher oxidation-side potential and Li ion conductivity than the conventional liquid electrolyte in which only LiTFSI was used, was obtained.

For the liquid electrolytes of Examples 4 to 9 in each of which $Na_2H_2P_2O_7$ was added, as shown in Table 1 and FIGS. 1 and 2, it was revealed that compared to Comparative Examples in each of which the amount of the LiTFSI per kg of the water was the same as Examples 4 to 9 while the amount of the LiTFSI per kg of the water was in a range of from 5 mol to 21 mol, not only the oxidation-side potential but also the reduction-side potential expand, and the liquid electrolytes shows a very wide potential window ($\Delta V$) of from 2.88 V to 3.33 V.

The reason why such a very wide potential window was shown by the addition of $Na_2H_2P_2O_7$, is not clear. However, it is thought that this is because, due to a difference in polarization state between the pyrophosphate ion and other phosphorus oxyacid ions, a difference in adsorption to the electrode surface was caused, and the pyrophosphate ion had higher solubility than other phosphorus oxyacid ions.

As shown in Table 2, for the liquid electrolyte of Example 22 in which $Na_2H_2P_2O_7$ was added and LiFSI was used as the electrolyte in place of the LiTFSI, it was revealed that compared to Comparative Example 10 in which LiFSI was used and $Na_2H_2P_2O_7$ was not added, not only the oxidation-side potential but also the reduction-side potential expand, and the liquid electrolyte shows a very wide potential window ($\Delta V$) of 3.05 V. Therefore, it is thought that as long as the electrolyte is the lithium salt of the sulfonimide, the oxidation-side potential in the potential window is increased by combining the electrolyte with at least one kind of anion selected from the group consisting of an orthophosphoric ion, a pyrophosphate ion, an anion resulting from dissociation of phosphorous acid or a salt thereof, and an anion resulting from dissociation of phosphinic acid or a salt thereof.

As shown in FIG. 3, for the lithium ion secondary battery produced from the liquid electrolyte of Comparative Example 10 in which LiFSI was used and $Na_2H_2P_2O_7$ was not added, the charge-discharge efficiency rapidly decreased in the second and subsequent cycles. Meanwhile, for the lithium ion secondary battery produced from the liquid electrolyte of Example 22 in which LiFSI was used and $Na_2H_2P_2O_7$ was added, the charge-discharge efficiency increased by about 50% until the third cycle, and then the lithium ion secondary battery maintained a charge-discharge efficiency of about 50% until the 100th cycle.

It is thought that this is due to the following reasons: since the SEI formed from the LiFSI and $Na_2H_2P_2O_7$ interfered with contact between the water in the electrolyte and the electrode, decomposition of the water, which is a side reaction, was suppressed, and more current was used to charge the lithium titanate (LTO) during a reduction reaction.

Due to the above reasons, for the liquid electrolyte for lithium ion secondary batteries according to the disclosed embodiments, which is a liquid electrolyte for lithium ion secondary batteries, the liquid electrolyte containing a lithium salt of a sulfonimide and water, wherein the liquid electrolyte contains at least one kind of anion selected from the group consisting of an orthophosphoric ion, a pyrophosphate ion, an anion resulting from phosphorous acid or a salt thereof, and an anion resulting from phosphinic acid or a salt thereof, it was proved that the oxidation-side potential in the potential window is increased.

The invention claimed is:

1. A liquid electrolyte for lithium ion secondary batteries, the liquid electrolyte containing a lithium salt of a sulfonimide and water,
   wherein the liquid electrolyte contains at least one kind of anion selected from the group consisting of an orthophosphoric ion, a pyrophosphate ion, an anion resulting from dissociation of phosphorous acid or a salt thereof, and an anion resulting from dissociation of phosphinic acid or a salt thereof.

2. The liquid electrolyte for lithium ion secondary batteries according to claim 1, wherein the lithium salt of the sulfonimide is at least one selected from the group consisting of lithium bis(trifluorosulfonyl)imide (LiTFSI) and lithium bis(fluorosulfonyl)imide (LiFSI).

3. The liquid electrolyte for lithium ion secondary batteries according to claim 2, wherein an amount of the LiTFSI per kg of the water is from 5 mol to 21 mol, and the anion is a pyrophosphate ion.

4. A method for producing a liquid electrolyte for lithium ion secondary batteries, the liquid electrolyte containing a lithium salt of a sulfonimide and water,
   wherein phosphorus oxyacid containing at least one kind of anion selected from the group consisting of an orthophosphoric ion, a pyrophosphate ion, a phosphorous acid ion and a phosphinic acid ion, or a salt thereof is added to the liquid electrolyte as an additive.

5. The method for producing the liquid electrolyte for lithium ion secondary batteries according to claim 4, wherein the lithium salt of the sulfonimide is at least one selected from the group consisting of lithium bis(trifluorosulfonyl)imide (LiTFSI) and lithium bis(fluorosulfonyl)imide (LiFSI).

6. The method for producing the liquid electrolyte for lithium ion secondary batteries according to claim 5, wherein at least one kind of phosphorus oxoate selected from the group consisting of $Li_3PO_4$, $LiH_2PO_4$, $NaH_2PO_4$, $Na_2H_2P_2O_7$, $Na_2HPO_3$ and $NaPH_2O_2$, is added.

7. The method for producing the liquid electrolyte for lithium ion secondary batteries according to claim 5, wherein an amount of the LiTFSI per kg of the water is adjusted to 5 mol to 21 mol, and $Na_2H_2P_2O_7$ is added as the phosphorus oxoate.

8. A lithium ion secondary battery comprising an anode, a cathode and a liquid electrolyte,
   wherein the liquid electrolyte contains a lithium salt of a sulfonimide and water, and
   wherein the liquid electrolyte contains at least one kind of anion selected from the group consisting of an orthophosphoric ion, a pyrophosphate ion, an anion resulting from dissociation of phosphorous acid or a salt thereof, and an anion resulting from dissociation of phosphinic acid or a salt thereof.

9. The lithium ion secondary battery according to claim 8, wherein the lithium salt of the sulfonimide is at least one selected from the group consisting of lithium bis(trifluorosulfonyl)imide (LiTFSI) and lithium bis(fluorosulfonyl)imide (LiFSI).

10. The lithium ion secondary battery according to claim 9, wherein an amount of the LiTFSI per kg of the water is from 5 mol to 21 mol, and the anion is a pyrophosphate ion.

* * * * *